United States Patent [19]
Medsker et al.

[11] Patent Number: 5,936,028
[45] Date of Patent: *Aug. 10, 1999

[54] HYDROSILYLATION CROSSLINKING

[75] Inventors: Robert Eugene Medsker, Hartville; Raman Patel, Akron; Jianqun Zhao, Stow; Gary Gilbertson, Barberton, all of Ohio

[73] Assignee: Advanced Elastomer Systems, L.P., Akron, Ohio

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/749,756

[22] Filed: Nov. 1, 1996

Related U.S. Application Data

[63] Continuation-in-part of application No. 08/566,380, Dec. 1, 1995, Pat. No. 5,672,660.

[51] Int. Cl.⁶ ........................................... C08L 83/10
[52] U.S. Cl. .................. 524/506; 525/105; 525/106
[58] Field of Search ..................... 525/105, 106; 524/506

[56] References Cited

U.S. PATENT DOCUMENTS

| | | | |
|---|---|---|---|
| 4,525,528 | 6/1985 | Bush et al. | 524/860 |
| 4,681,913 | 7/1987 | Evans et al. | 524/862 |
| 4,803,244 | 2/1989 | Umpleby | 525/105 |
| 4,831,081 | 5/1989 | King et al. | 525/105 |
| 5,010,137 | 4/1991 | Umeda et al. | 525/104 |
| 5,053,473 | 10/1991 | Suzuki et al. | 528/29 |
| 5,208,289 | 5/1993 | Takarada et al. | 525/100 |
| 5,324,807 | 6/1994 | Yamada et al. | 525/446 |
| 5,357,023 | 10/1994 | Inoue et al. | 528/32 |
| 5,364,921 | 11/1994 | Gray et al. | 528/32 |
| 5,416,147 | 5/1995 | Takarada et al. | 524/399 |
| 5,447,990 | 9/1995 | Noda et al. | 525/106 |
| 5,597,867 | 1/1997 | Tsujimoto et al. | 525/74 |
| 5,672,660 | 9/1997 | Medsker et al. | 525/101 |

FOREIGN PATENT DOCUMENTS

| | | |
|---|---|---|
| 0 491 561 A2 | 6/1992 | European Pat. Off. . |
| 0 496 419 A2 | 7/1992 | European Pat. Off. . |
| 0 651 009 | 5/1994 | European Pat. Off. . |
| 0 655 471 A1 | 5/1995 | European Pat. Off. . |
| 6-212035 | 8/1994 | Japan . |
| 1118327 | 7/1968 | United Kingdom . |

*Primary Examiner*—Margaret W. Glass Moore
*Attorney, Agent, or Firm*—William A. Skinner

[57] ABSTRACT

An improved process for the preparation of thermoplastic elastomers by hydrosilylation crosslinking, in which a platinum containing hydrosilylation catalyst is used in combination with oil which is substantially free of materials which have the chemical behavior of a Lewis base. A crosslinked rubber component is obtained in the thermoplastic elastomer composition.

11 Claims, No Drawings

HYDROSILYLATION CROSSLINKING

CROSS-REFERENCE TO RELATED APPLICATIONS

This is a continuation-in-part of U.S. patent application Ser. No. 08/566,380 filed Dec. 1, 1995, now U.S. Pat. No. 5,672,660.

BACKGROUND OF THE INVENTION

1. Field of the Invention

This invention relates to thermoplastic elastomer compositions prepared using hydrosilylation crosslinking of the elastomer component of the composition. A thermoplastic elastomer is generally defined as a polymer or blend of polymers that can be processed and recycled in the same way as a conventional thermoplastic material, yet has properties and functional performance similar to that of vulcanized rubber at service temperatures. Blends or alloys of plastic and elastomeric rubber have become increasingly important in the production of high performance thermoplastic elastomers, particularly for the replacement of thermoset rubbers in various applications. High performance thermoplastic elastomers in which a highly vulcanized rubbery polymer is intimately dispersed in a thermoplastic matrix are generally known as thermoplastic vulcanizates.

2. Description of the Related Art

Polymer blends which have a combination of both thermoplastic and elastic properties are generally obtained by combining a thermoplastic resin with an elastomeric composition in a way such that the elastomer component is intimately and uniformly dispersed as a discrete particulate phase within a continuous phase of the thermoplastic. Early work with vulcanized rubber components is found in U.S. Pat. No. 3,037,954 which discloses both static vulcanization of the rubber, as well as the technique of dynamic vulcanization wherein a vulcanizable elastomer is dispersed into a molten resinous thermoplastic polymer and the elastomer is cured while continuously mixing and shearing the blend. The resulting composition is a micro-gel dispersion of cured elastomer in an uncured matrix of thermoplastic polymer.

In U.S. Pat. No. Re. 32,028 polymer blends comprising an olefin thermoplastic resin and an olefin copolymer are described, wherein the rubber is dynamically vulcanized to a state of partial cure. The resulting compositions are reprocessible. U.S. Pat. Nos. 4,130,534 and 4,130,535 further disclose thermoplastic vulcanizates comprising butyl rubber and polyolefin resin, and olefin rubber and polyolefin resin, respectively. The compositions are prepared by dynamic vulcanization and the rubber component is cured to the extent that it is essentially insoluble in conventional solvents. A range of crosslinking, or curing, agents for the vulcanization of the rubber are described in the early art, including peroxides, sulfurs, phenolic resins, radiation, and the like.

U.S. Pat. No. 4,803,244 generally discusses the use of multifunctional organosilicon compounds in conjunction with a catalyst as an agent for crosslinking the rubber component of a thermoplastic elastomer by hydrosilylation. Hydrosilylation involves the addition of a silicon hydride across a multiple bond, often with a transition metal catalyst. This patent describes a rhodium catalyzed hydrosilylation of EPDM rubber in a blend with polypropylene to produce thermoplastic elastomers having a gel content of up to 34% (after correction for the plastic phase). This degree of vulcanization was achieved only with a high level of catalyst.

A further modification of hydrosilylation crosslinking of the rubber in a thermoplastic elastomer composition is disclosed in European Patent Application No. 651,009. A compatibilizing agent containing in the same molecule a component having an affinity for the rubber and a component having an affinity for the thermoplastic resin is incorporated into the composition, and is said to improve adhesion between the rubber and resin in order to prevent agglomeration.

SUMMARY OF THE INVENTION

The present invention is based on the discovery that the process for hydrosilylation crosslinking of the rubber in a thermoplastic elastomer can be improved by employing a platinum-containing catalyst in combination with a diene-containing elastomer having predominately sterically unhindered carbon-carbon double bonds. This combination provides rapid crosslinking of the elastomer to a fully vulcanized state, yet requires an unexpectedly low concentration of the catalyst in order to achieve the cure. In the instant invention no compatibilizer is required in order to produce compositions with excellent mechanical properties, no bubble formation and very good colorability, due to the extremely low levels of catalyst concentration. Surprisingly, lower catalyst concentrations also produce compositions with much improved heat aging characteristics, resistance to degradation by ultraviolet light and having a non-hygroscopic character.

In another embodiment of the invention, dynamic vulcanization of a blend of thermoplastic resin and an unsaturated rubber in the presence of a hydrosilylation agent, a platinum-containing hydrosilylation catalyst and an extender or processing oil is unexpectedly improved by the use of oil which is substantially free of materials which have the chemical behavior of a Lewis base. Lewis base behavior may be generally defined as bond formation by donation of a pair of electrons. This embodiment of the invention requires an even lower concentration of catalyst to achieve cure of the rubber, and the resulting thermoplastic elastomer product has excellent tensile properties and no undesirable color. Good heat aging, ultraviolet stability and non-hygroscopic properties also result.

In a further embodiment of the invention, additives which react with residual silicon hydride functionality in the thermoplastic elastomer are incorporated into the process. This results in a composition which has further improved long term heat aging characteristics.

The compositions produced by the improved process have utility as replacements for thermoset rubber compounds in a variety of applications, particularly where molding or extrusion is involved and the combination of thermoplastic and elastomeric properties provides an advantage. Typical uses include molded articles for automobile underhood parts, engineering and construction materials, mechanical rubber goods, industrial parts such as hose, tubing and gaskets, electrical applications and household goods.

DESCRIPTION OF THE PREFERRED EMBODIMENTS

Thermoplastic elastomer compositions may generally be prepared by blending a thermoplastic resin and a rubber, then melting the thermoplastic component and mixing the melt until the blend is homogeneous. If a composition of vulcanized rubber in a thermoplastic matrix is desired, crosslinking agents (also referred to as curatives or vulcanizing agents) are added to the blend and crosslinking occurs during the mixing. This latter process is described as dynamic vulcanization.

A wide range of thermoplastic resins and rubbers and/or their mixtures have been used in the preparation of thermoplastic elastomers, including polypropylene, HDPE, LDPE, VLDPE, LLDPE, cyclic olefin homopolymers or copolymers as well as olefinic block copolymers, polystyrene, polyphenylene sulfide, polyphenylene oxide and ethylene propylene copolymer (EP) thermoplastics, with ethylene propylene diene rubber (EPDM), acrylonitrile butadiene rubber (NBR) and natural rubber (NR) as the elastomers. When the elastomer component is crosslinked, agents such as sulfur, peroxide, phenolics and ionic compounds are often used.

Hydrosilylation Agents

Hydrosilylation has also been disclosed as a crosslinking method. In this method a silicon hydride having at least two SiH groups in the molecule is reacted with the carbon-carbon multiple bonds of the unsaturated (i.e. containing at least one carbon-carbon double bond) rubber component of the thermoplastic elastomer, in the presence of the thermoplastic resin and a hydrosilylation catalyst. Silicon hydride compounds useful in the process of the invention include methylhydrogen polysiloxanes, methylhydrogen dimethylsiloxane copolymers, alkyl methyl polysiloxanes, bis(dimethylsilyl)alkanes and bis(dimethylsilyl)benzene.

Preferred silicon hydride compounds may be described by the formula

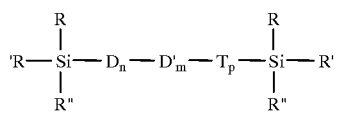

(1)

where each R is independently selected from the group consisting of alkyls comprising 1 to 20 carbon atoms, cycloalkyls comprising 4 to 12 carbon atoms and aryls. In formula (1) it is preferred that each R be independently selected from a group consisting of alkyls comprising 1 to 6 carbon atoms. Even more preferred is R=methyl. R' represents a hydrogen atom, an alkyl or alkoxy group having from 1 to about 24 carbon atoms. R" represents R or a hydrogen atom.

D represents the group

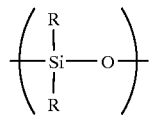

D' represents the group

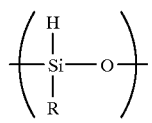

T represents the group

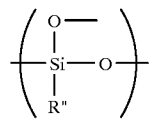

m is an integer having a value ranging from 1 to 50,
n is an integer having a value ranging from 1 to 50, and
p is an integer having a value ranging from 0 to 6.

Particularly preferred polyorganosiloxanes are those in which the silicon atom of the silicon hydride functionality is bound by heteroatoms/atoms having lone pairs of electrons. The preferred polyorganosiloxanes may also be substituted with appropriate functionality permitting solubility in the reaction media. A type of this functionalization is described in U.S. Pat. No. 4,046,930 which teaches alkylation of polyorganosiloxanes. Weight percent of alkylation should not exceed a level that does not permit adequate reaction rates due to steric constraints.

The amount of silicon hydride compound useful in the process of the present invention can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer.

Thermoplastic Resins

Thermoplastic resins useful in the compositions produced by the invention include crystalline polyolefin homopolymers and copolymers. They are desirably prepared from monoolefin monomers having 2 to 20 carbon atoms, such as ethylene, propylene, 1-butene, 1-pentene and the like, as well as copolymers derived from linear and cyclic olefins, with propylene being preferred. As used in the specification and claims the term polypropylene includes homopolymers of propylene as well as reactor copolymers of polypropylene which can contain about 1 to about 20 wt % of ethylene or an α-olefin comonomer of 4 to 20 carbon atoms, and mixtures thereof. The polypropylene can be crystalline, isotactic or syndiotactic polypropylene. Commercially available polyolefins may be used in the practice of the invention. Other thermoplastic resins which are substantially inert to the rubber, the silicon hydride and the hydrosilylation catalyst would also be suitable. Blends of thermoplastic resins may also be used.

The amount of thermoplastic resin found to provide useful compositions is generally from about 5 to about 90 weight percent, based on the weight of the rubber and resin. Preferably, the thermoplastic resin content will range from about 20 to about 80 percent by weight of the total polymer.

Rubbers

Unsaturated rubbers useful to prepare thermoplastic elastomers according to the invention include monoolefin copolymer rubbers comprising non-polar, rubbery copolymers of two or more α-monoolefins, preferably copolymerized with at least one polyene, usually a diene. However, unsaturated monoolefin rubber such as EPDM rubber is more suitable. EPDM is a polymer of ethylene, propylene and one or more non-conjugated diene or non-conjugated dienes, and the monomer components may be polymerized using Ziegler-Natta or metallocene catalyzed reactions, among others. Satisfactory non-conjugated dienes include 5-ethylidene-2-norbornene (ENB); 1,4-hexadiene (HD); 5-methylene-2-norbornene (MNB); 1,6-octadiene; 5-methyl-1,4-hexadiene; 3,7-dimethyl-1,6-octadiene; 1

3-cyclopentadiene; 1,4-cyclohexadiene; dicyclopentadiene (DCPD); 5-vinyl-2-norbornene (VNB) and the like, or a combination thereof In one embodiment of the invention, it has been found that rubber having a structure in which the diene monomer has carbon-carbon multiple bonds which are predominately unencumbered, i.e. bonds which are sterically unhindered such as terminal or pendant double bonds, provide a greatly improved rate of cure in the hydrosilylation curing process of the invention. Included in this embodiment are structures in which the bonds either normally are unencumbered or are easily isomerized to form a sterically unencumbered double bond, which is then rapidly hydrosilated, e.g. 1,4-hexadiene or ENB. This improvement is particularly significant where a fully cured rubber component is desired. The use of rubber in which the diene component is selected from the group consisting of 5-ethylidene-2-norbornene, 5-methyl-1,4-hexadiene, 1,4-hexadiene and 5-vinyl-2-norbornene is preferred. 5-vinyl-2-norbornene is particularly preferred as a diene component of such rubber.

Butyl rubbers are also useful in the compositions of the invention. As used in the specification and claims, the term "butyl rubber" includes copolymers of an isoolefin and a conjugated monoolefin, terpolymers of an isooolefin, a conjugated monoolefin and divinyl aromatic monomers, and the halogenated derivatives of such copolymers and terpolymers. The useful butyl rubber copolymers comprise a major portion of isoolefin and a minor amount, usually less than 30 wt %, of a conjugated multioletin. The preferred copolymers comprise about 85–99.5 wt % of a $C_{4-7}$ isoolefin such as isobutylene and about 15–0.5 wt % of a multiolefin of 4–14 carbon atoms, such as isoprene, butadiene, dimethyl butadiene, 4-methyl-1,4-pentadiene and piperylene. Commercial butyl rubber, useful in the invention, is a copolymer of isobutylene and minor amounts of isoprene. Other butyl co- and terpolymer rubbers are illustrated by the description in U.S. Pat. No. 4,916,180. Isobutylene/divinylbenzene is particularly preferred as an elastomer suitable for hydrosilylation crosslinking, as are the halogenated derivatives of butyl rubber such as chlorobutyl and bromobutyl.

A further rubber suitable in the invention is natural rubber. The main constituent of natural rubber is the linear polymer cis-1,4-polyisoprene. It is normally commercially available in the form of smoked sheets and crepe. Synthetic polyisoprene can also be used with the particularly preferred synthetic polyisoprene elastomers being those that contain vinyl functionality pendant to the main polymer chain, i.e. 1,2-enchainments.

Polybutadiene is also a suitable elastomer for hydrosilylation curing with polybutadienes that contain vinyl functionality being the most preferred.

Blends of any of the above rubbers may also be employed, rather than a single olefinic rubber.

In preparing the compositions of the invention, the amount of rubber generally ranges from about 95 to about 10 weight percent, based on the weight of the rubber and thermoplastic resin. Preferably, the rubber content will be in the range of from about 80 to about 20 weight percent of total polymer.

Hydrosilylation Catalysts

It has previously been understood that any catalyst, or catalyst precursor capable of generating a catalyst in situ, which will catalyze the hydrosilylation reaction with the carbon-carbon bonds of the rubber can be used. Such catalysts have included transition metals of Group VIII such as palladium, rhodium, platinum and the like, including complexes of these metals. Chloroplatinic acid has been disclosed as a useful catalyst in U.S. Pat. No. 4,803,244 and European Application No. 651,009, which further disclose that the catalyst may be used at concentrations of 5 to 10,000 parts per million by weight and 100 to 200,000 parts per million by weight based on the weight of rubber, respectively.

It has been found in the process of the present invention that significantly lower concentrations of platinum-containing catalyst can be used, while obtaining improvement in both the speed of the reaction and the efficiency of the crosslinking. Concentrations of catalyst in the range of about 0.01 to about 20 parts per million by weight, expressed as platinum metal, are effective in rapidly and completely curing the rubber in the process of dynamically vulcanizing blends of thermoplastic resin and rubber. These low catalyst concentrations are particularly effective in combination with a diene-containing rubber having carbon-carbon multiple bonds which are predominately sterically unhindered. Catalyst concentrations of about 0.1 to about 4 parts per million by weight based on the weight of rubber, expressed as platinum metal, are particularly preferred.

Platinum-containing catalysts which are useful in the process of the invention are described, for example, in U.S. Pat. No. 4,578,497; U.S. Pat. No. 3,220,972; and U.S. Pat. No. 2,823,218 all of which are incorporated herein by this reference. These catalysts include chloroplatinic acid, chloroplatinic acid hexahydrate, complexes of chloroplatinic acid with sym-divinyltetramethyldisiloxane, dichloro-bis (triphenylphosphine) platinum (II), cis-dichloro-bis (acetonitrile) platinum (II), dicarbonyldichloroplatinum (II), platinum chloride and platinum oxide. Zero valent platinum metal complexes such as Karstedt's catalyst are particularly preferred, as described in U.S. Pat. No. 3,775,452; U.S. Pat. No. 3,814,730; and U.S. Pat. No. 4,288,345 all of which are incorporated herein by this reference.

In order for the catalyst to function most efficiently in the dynamic vulcanization environment, it is important that it is inherently thermally stable, or that its activity is inhibited to prevent too rapid a reaction or catalyst decomposition. Appropriate catalyst inhibitors that are suitable to stabilize the platinum catalyst at high temperatures include 1,3,5,7-tetravinyl-1,3,5,7-tetramethylcyclotetrasiloxane and its higher analogs such as vinyl cyclic pentamer. However, other olefins that are stable above 165° C. are also useful. These include maleates, fumarates and the cyclic pentamer. It is also particularly preferred in the invention to use a catalyst that remains soluble in the reaction medium.

Additives

The thermoplastic elastomer may contain conventional additives, which can be introduced into the composition in the thermoplastic resin, the rubber, or in the blend either before, during or after the hydrosilylation and curing. Examples of such additives are antioxidants, processing aids, reinforcing and nonreinforcing fillers, pigments, waxes, rubber processing oil, extender oils, antiblocking agents, antistatic agents, ultraviolet stabilizers, plasticizers (including esters), foaming agents, flame retardants and other processing aids known to the rubber compounding art. Such additives may comprise from about 0.1 to about 300 percent by weight based on the weight of the final thermoplastic elastomer product. Fillers and extenders which can be utilized include conventional inorganics such as calcium carbonate, clays, silica, talc, titanium dioxide, carbon black and the like. Additives, fillers or other compounds which may interfere with the hydrosilylation should be added after curing reaches the desired level.

In another embodiment, it has been found that the heat aging properties of compositions prepared according to the invention can be greatly improved by the addition of a metal chelating agent to the blend. This effect is believed to be due to the fact that the hydrosilylation catalyst is in an active valence state. This form of the platinum metal accelerates degradation of the thermoplastic elastomer, particularly under conditions of elevated temperature over an extended time. Chelation prevents the metal from causing degradation.

Typical chelating agents useful for this purpose include materials such as 1,2-bis(3,5-di-ter-butyl-4-hydroxyhydrocinnamoyl)hydrazine and the like. Surprisingly, these agents may be incorporated into the composition prior to or after the hydrosilylation curing. Amounts of chelating agent ranging from about 0.025 parts per hundred parts of rubber (phr) to about 10 phr have been found to be useful, and amounts in the range of about 0.1 phr to 2 phr are preferred.

In a further embodiment of the invention, it has been demonstrated that reducing residual or unreacted silicon hydride functionality in the thermoplastic elastomer products results in compositions which have improved heat stability. Unreacted silicon hydride may be reduced or eliminated by reacting the silicon hydride with compounds containing active hydrogen, carbon-carbon multiple bonds, carbon-oxygen double bonds or carbon-nitrogen double bonds and the like. The residual silicon hydride reacts with these compounds to eliminate silicon hydride functionality and form silicon-oxygen or carbon-silicon bonds.

Typical compounds useful for this purpose are silica and water. These agents are incorporated into the composition after the hydrosilylation cure is complete. Water may be introduced as steam anytime after cure in a single or two pass operation. Amounts of such compounds may be estimated by measuring residual silicon hydride and adding a stoichiometric amount of the compound. One may also desire to add a stoichiometric excess if necessary to eliminate a sufficient amount of the residual silicon hydride in order to realize the desired improvement in heat aging properties. Amounts of such compounds ranging from about one mole equivalent to about 10 mole equivalents have been found to be useful, and amounts in the range of about 1 to 3 mole equivalents are preferred.

Extender Oil

The rubber processing or extender oils used in thermoplastic elastomers generally are paraffinic, naphthenic or aromatic oils derived from petroleum fractions. The type will be that ordinarily used in conjunction with the specific rubber or rubbers present in the composition, and the quantity based on the total rubber content of the thermoplastic elastomer may range from zero to several hundred parts per hundred rubber. Important to the efficiency of the catalyst is that the oils and other additives contain no or very low concentrations of compounds that are catalyst inhibitors or that interfere with the activity of the catalyst. These compounds include phosphines, amines, sulfides, thiols or other compounds that may be classified as Lewis bases. Lewis bases, or other compounds that have a pair of electrons available for donation, will react with the platinum catalyst, effectively neutralizing its activity. It has been discovered that the presence of such compounds has a surprisingly detrimental impact on hydrosilylation curing in the process of dynamic vulcanization of the rubber component of the thermoplastic elastomer compositions. If the concentration of compounds which have the chemical reactivity of Lewis bases, such as compounds containing sulfur or nitrogen, is maintained at or below a level which provides less than about 1000 ppm and 300 ppm of sulfur and nitrogen respectively, then the amount of platinum catalyst required to promote efficient hydrosilylation curing in dynamic vulcanization can be substantially reduced, usually to the range of about 4 ppm or less, without impact on the cure state of the rubber or the tensile properties of the thermoplastic elastomer product. Concentrations of sulfur and nitrogen below about 500 and 200 ppm respectively are more preferred, and concentrations of less than about 30 ppm sulfur and less than about 100 ppm nitrogen are most preferred. It has been discovered that, even at catalyst concentrations as low as 0.25 ppm, full cure of the elastomer can be achieved if the concentration of sulfur and nitrogen is within the most preferred ranges.

Most paraffinic petroleum oils for the rubber industry are derived from a crude oil distillation stream. A typical refining history would include some type of dewaxing to reduce the pour point, a solvent extraction to physically remove aromatic compounds and a hydrotreating process to chemically modify aromatic structures. Both extraction and hydrotreating result in a net increase in the total concentration of saturated hydrocarbon structures and a net decrease in the total aromatic, sulfur and nitrogen-containing compound concentration. The degree of reduction in concentration of these compounds in the oil is dependent upon the type and severity of the refining employed, and the nature of the crude oil. White and paraffinic oils have been treated more extensively than aromatic and napthenic oils and would contain a smaller concentration of aromatic, sulfur and/or nitrogen compounds. It is difficult to elucidate the exact chemical structure of these compounds due to their complexity. The tendency of an oil to interfere with platinum catalyzed hydrosilylation is directly related to the concentration of sulfur and nitrogen containing compounds, as well as compounds which contain phosphorus, tin, arsenic, aluminum and iron.

Processing

The rubber component of the thermoplastic elastomer is generally present as small, i.e. micro-size, particles within a continuous thermoplastic resin matrix, although a co-continuous morphology or a phase inversion is also possible depending upon the amount of rubber relative to plastic and the degree of cure of the rubber. The rubber is desirably at least partially crosslinked, and preferably is completely or fully crosslinked. It is preferred that the rubber be crosslinked by the process of dynamic vulcanization. As used in the specification and claims, the term "dynamic vulcanization" means a vulcanization or curing process for a rubber blended with a thermoplastic resin, wherein the rubber is vulcanized under conditions of shear at a temperature at which the mixture will flow. The rubber is thus simultaneously crosslinked and dispersed as fine particles within the thermoplastic resin matrix, although as noted above other morphologies may exist. Dynamic vulcanization is effected by mixing the thermoplastic elastomer components at elevated temperatures in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compression molding. Scrap or flashing can be salvaged and reprocessed.

The terms "fully vulcanized" and "fully cured" or "fully crosslinked" as used in the specification and claims means that the rubber component to be vulcanized has been cured or crosslinked to a state in which the elastomeric properties of the crosslinked rubber are similar to those of the rubber in its conventional vulcanized state, apart from the thermoplastic elastomer composition. The degree of cure can be described in terms of gel content, or conversely, extractable components. Gel content reported as percent gel (based on the weight of crosslinkable rubber) is determined by a procedure which comprises determining the amount of insoluble polymer by soaking the specimen for 48 hours in organic solvent at room temperature, weighing the dried residue and making suitable corrections based upon knowledge of the composition. Thus, corrected initial and final weights are obtained by subtracting from the initial weight the weight of soluble components, other than rubber to be vulcanized, such as extender oils, plasticizers and components of the composition soluble in organic solvent, as well as that rubber component of the product which is not intended to be cured. Any insoluble polyolefins, pigments, fillers, and the like are subtracted from both the initial and final weights. The rubber component can be described as fully cured when less than about 5%, and preferably less than 3%, of the rubber which is capable of being cured by hydrosilylation is extractable from the thermoplastic elastomer product by a solvent for that rubber. Alternatively the degree of cure may be expressed in terms of crosslink density. All of these descriptions are well known in the art, for example in U.S. Pat. Nos. 4,593,062, 5,100,947 and 5,157,081, all of which are fully incorporated herein by this reference.

The following general procedure was used in the preparation of thermoplastic elastomers by the process of the invention, as set forth in the examples. The thermoplastic resin and oil extended rubber were placed in a heated internal mixer, with the hydrosilylation agent and hydrosilylation catalyst. The hydrosilylation agent and catalyst can be incorporated into the composition by any suitable technique, for example by injection as solutions in oil or as neat components, although a dilute catalyst solution is preferred. Additives such as antioxidants, ultraviolet stabilizers and fillers may also be added as a slurry in oil. Masterbatches of the components may also be prepared to facilitate the blending process. The mixture was heated to a temperature sufficient to melt the thermoplastic component, and the mixture was masticated, with added processing oil if desired, until a maximum of mixing torque indicated that vulcanization had occurred. Mixing was continued until the desired degree of vulcanization was achieved.

The order of addition of the hydrosilylation agent and hydrosilylation catalyst was found to be important. Maximum catalyst efficiency was obtained when the hydrosilylation agent was added first to the blend, followed by the hydrosilylation catalyst. The mechanical properties of the thermoplastic elastomer products, as well as the degree of cure, were improved when this order of addition was followed.

The invention will be better understood by reference to the following examples which serve to illustrate but not limit the present process. In the examples, the following test methods were used to determine the properties of the thermoplastic elastomer products.

Hardness (Shore A|D)—ASTM D 2240
Ultimate tensile strength (UTS-psi)—ASTM D 412
Ultimate elongation (UE-%)—ASTM D 412
Modulus at 100/300% elongation (M1 or M3-psi)—ASTM D412
Tension set (TS-%)—ASTM D 412
Oil swell (OS-%)—ASTM D 471
Heat aging—ASTM D 573

The rubber component used in the compositions prepared according to the examples are further identified as follows.
Rubber "A"—EPDM-2.1% ENB; 52% ethylene
Rubber "B"—EPDM-5% HD; 55% ethylene
Rubber "C"—EPDM 3% VNB; 64% ethylene
Rubber "D"—EPDM-1.6% VNB; 50% ethylene
Rubber "E"—EPDM-0.9% VNB; 72% ethylene
Rubber "F"—EPDM-3% VNB; 55% ethylene
Rubber "G"—EPDM-5.5% ENB; 60% ethylene
Rubber "H"—EPDM-3% DCPD; 66% ethylene
Rubber "I"—EPDM-4.2% ENB; 0.3% VNB; 58% ethylene
Rubber "J"—EPDM-4.4% ENB; 68% ethylene
Rubber "K"—EPDM-1.1% VNB; 64% ethylene
Rubber "L"—EPDM-0.7% VNB; 62.6% ethylene

EXAMPLE 1

Compositions were prepared by the method of the invention as generally described above, using polypropylene resin and EPDM rubber containing ENB as the diene component. The plastic and rubber components were melt mixed in a Brabender mixer at 180° C. until the polypropylene was melted. Silicone hydride (alkylated methyl hydrogen polysiloxane) was added dropwise to the melt mix, followed by addition of an oil solution containing platinum [platinate (II) hexachloro, dihydrogen reaction product with 2,4,6,8-tetraethenyl-2,4,6,8-tetramethyl cyclotetrasiloxane]. The rubber was dynamically vulcanized by mixing the blend until the maximum torque was reached. The product was removed from the mixer, then returned to the mixer and masticated at 180° C. for an additional minute. Plaques were prepared by compression molding the products of the dynamic vulcanization at 200° C. to a thickness of 60 mil and cooling under pressure, and the physical properties were determined using these plaques. All of the products were elastomeric, as defined by ASTM D1566, i.e. all had tension set values of less than 50%. The compositions and their properties are set forth in Table I.

For the purposes of comparison, example 1 of U.S. Pat. No. 4,803,244 is also set forth. In this comparative example, similar resin and rubber components were dynamically vulcanized by hydrosilylation, but the equivalent of 35 ppm of rhodium metal was used as the catalyst.

TABLE I

|  | Composition A | Patent Ex. 1 |
| --- | --- | --- |
| Polypropylene (parts) | 67 | 50 |
| Rubber "A" (parts) | 100 | 100 |
| Si—H (phr) | 2.5 | 6.7 |
| Rhodium (ppm) | — | 35 |
| Platinum (ppm) | 15 | — |
| Hardness (A/D) | 93/40 | 88/26 |
| UTS (psi) | 2500 | 769 |
| UE (%) | 405 | 240 |
| M1 | 1750 | 305 |
| TS (%) | 22 | 43 |
| Gel (%) (corrected for plastic phase) | 95 | 15 |

It can be seen that the use of much lower levels of platinum catalyst in the hydrosilylation crosslinking of EPDM rubber containing ENB results in a marked increase in the level of crosslinking (as reflected by gel content) and improved tensile properties in the thermoplastic elastomer, as compared to the use of rhodium as the catalyst.

EXAMPLE 2

Compositions were prepared as in Example 1, using EPDM rubber containing 1,4-hexadiene as the diene ternonomer. Platinum (as in Example 1) was used as the hydrosilylation catalyst. Plaques were prepared from the products and physical properties were determined. The results are set forth in Table II.

Again for the purposes of comparison with a rhodium-catalyzed hydrosilylation, example 7 of U.S. Pat. No. 4,803, 244 is set forth. In this comparative example, a blend of polypropylene and EPDM (containing hexadiene) was dynamically vulcanized by hydrosilylation usipg the equivalent of 35 ppm of rhodium metal as the catalyst.

TABLE II

| Composition- | B | C | D | E | Pat. Ex. 7 |
|---|---|---|---|---|---|
| PP (parts) | 67 | 67 | 67 | 67 | 50 |
| Rubber "B" (parts) | 100 | 100 | 100 | 100 | 100 |
| Si—H (phr) | 0 | 3 | 3 | 3 | 6.7 |
| Rhodium (ppm) | — | — | — | — | 35 |
| Platinum (ppm) | 0 | 7.6 | 3.3 | 1.8 | 0 |
| Hardness (D) | 32 | 39 | 39 | 37 | 25 |
| UTS (psi) | 1080 | 2210 | 2070 | 1750 | 1280 |
| UE (%) | 440 | 330 | 340 | 160 | 180 |
| M1 | 940 | 1510 | 1580 | 1620 | — |
| TS (%) | 53 | 24 | 25 | 26 | 14 |
| Gel (%) | 0 | 92 | 91 | 88 | 34 |

As demonstrated by the data set forth above, EPDM rubber containing 1,4-hexadiene as the diene termonomer is crosslinked more efficiently and completely using a platinum catalyst in conjunction with a hydrosilating agent, as compared to a rhodium catalyst. The dynamic vulcanizates prepared using the platinum catalyst have substantially higher gel content and better tensile properties, even at catalyst concentrations which are orders of magnitude lower than those required for rhodium catalyst. The rate of crosslinking was also much faster using the platinum catalyst at low concentration, in comparison to the rhodium catalyst at higher concentrations.

EXAMPLE 3

Compositions were prepared using a twin-screw extruder as the mixing means for carrying out the dynamic vulcanization. EPDM rubbers containing either 5-vinyl-2-norbornene or 5-ethylidene-2-norbornene as the diene component were used, and were dynamically vulcanized by hydrosilylation with the platinum catalyst of Example 1. Plaques were prepared from the thermoplastic elastomer products and physical properties were determined. The results are set forth in Table III.

TABLE III

| Composition[1]- | F | G | H |
|---|---|---|---|
| Polypropylene (parts) | 41 | 41 | 41 |
| Rubber "F" (parts) | 100 | 100 | — |
| Rubber "G" (parts) | — | — | 100 |
| Si—H (phr) | 2.2 | 2.2 | 3 |
| Platinum (ppm) | 4 | 2 | 13 |
| Hardness (A) | 69 | 69 | 63 |
| UTS (psi) | 1080 | 1039 | 905 |
| UE (%) | 211 | 211 | 406 |
| M1 | 636 | 606 | 408 |
| Gel (%) | 99 | 99 | 90 |

[1]The compositions also contained 130 phr paraffin oil, 42 phr clay, 5 phr wax, 2 phr ZnO Compositions F and G, which utilized VNB/EPDM, had very high crosslinking levels even though the amounts of both hydrosilylation agent and catalyst were very low. Composition H (ENB/EPDM) had a lower, but still acceptable level of crosslinking.

EXAMPLE IV

For comparative purposes an EPDM rubber containing dicyclopentadiene was dynamically vulcanized as in Example 1, in the presence of polypropylene and using platinum catalyzed hydrosilylation curing. The melt temperature used for compositions I and J was 180° C., and for composition K was 200° C. The results are set forth in Table IV.

TABLE IV

| Composition - | I | J | K |
|---|---|---|---|
| Rubber "H" (parts) | 100 | 100 | 100 |
| Polypropylene (parts) | 67 | 67 | 67 |
| Si–H (phr) | 0 | 3 | 3 |
| Platinum (ppm) | 0 | 30.3 | 30.3 |
| Hardness (D) | 31 | 30 | 31 |
| UTS (psi) | 950 | 1220 | 1180 |
| UE (%) | 170 | 130 | 110 |
| M1 | 920 | 1150 | 1160 |
| TS (%) | 43 | 29 | 30 |
| Gel (%) | 18 | 76 | 77 |

High levels of hydrosilylation catalyst did not provide complete vulcanization of this rubber, which contains encumbered, i.e. internal, double bonds in the diene component.

EXAMPLE 5

Compositions were prepared using EPDM rubber containing a mixture of ENB and VNB as the diene component, using the conditions described in Example 1, and the products were compared with compositions made using the same EPDM rubber but wherein the hydrosilylation catalyst was Wilkinson's catalyst [chlorotris(triphenyl)phosphine rhodium (I)]. This is a rhodium catalyst representative of the catalysts disclosed in U.S. Pat. No. 4,803,244. The compositions prepared and the physical properties of the products are set forth in Table V.

TABLE V

| Composition[1]- | L | M | N |
|---|---|---|---|
| Polypropylene (parts) | 41 | 41 | 41 |
| Rubber "I" (parts) | 100 | 100 | 100 |
| H as Si—H (grams) | 0.008 | 0.008 | 0.005 |
| Rhodium (ppm) | 39 | 79 | — |
| Platinum (ppm) | — | — | 8 |
| Hardness (A) | 56 | 55 | 64 |
| UTS (psi) | 351 | 352 | 1050 |
| UE (%) | 485 | 550 | 415 |
| M1 | 153 | 152 | 500 |
| TS (%) | 11 | 10 | 7 |
| Gel (%) | 26 | 40 | 98 |

[1]The composition also contained 130 phr paraffin oil, 42 phr clay, 5 phr wax, 2 phr ZnO Platinum is a more efficient catalyst than rhodium for the hydrosilylation curing of EPDM rubber containing both ENB and VNB diene moieties. A 98% gel content (fully vulcanized) resulted from the use of 8 ppm platinum metal equivalent as the catalyst, whereas only 40% gel content was obtained from 79 ppm rhodium metal equivalent, under the same conditions. Superior physical properties were also obtained in the products of the platinum catalyzed hydrosilylation. Compositions prepared with a high level of Wilkinson's catalyst gave orange colored products.

EXAMPLE 6

As noted earlier, the heat aging properties of thermoplastic elastomers prepared by hydrosilylation crosslinking were found to be improved when residual Si-H functionality in the product is reacted with a compound which contains active hydrogen, carbon-carbon multiple bonds, carbon-oxygen bonds, and the like. Amorphous silica is also a compound useful for the removal of unreacted silicon hydride from the products. In this example, thermoplastic elastomer which was prepared by hydrosilylation crosslinking of the rubber component was blended in a Brabender mixer at 180° C. with amorphous silica. A thin film sample of each thermoplastic elastomer was prepared before and after mixing with silica. An FTIR spectrum was measured for each, and the area under the peak assigned to Si-H adsorption (2061 cm$^{-1}$) was determined. The samples were then heat aged at 150° C. for 7 and 14 days and the mechanical properties measured. The results are set forth in Table VI.

TABLE VI

| Composition - | O | P | Q | R |
|---|---|---|---|---|
| Elastomer[1](grams) | 45.8 | 45.8 | 45.8 | 45.8 |
| Polypropylene (phr) | 41 | 41 | 41 | 41 |
| Si—H (phr) | 2.7 | 2.7 | 1.6 | 2.7 |
| Platinum (ppm) | 27 | 27 | 27 | 27 |
| Silica[2] (phr) | — | 5.5 | 5.5 | 5.5* |
| Residual Si—H[3] | 2.8 | 1.5 | 1.0 | 1.5 |
| Seven days @ 150° C. | | | | |
| Hardness change (A) | 0 | 0 | +1 | +1 |
| % UTS retained | 110 | 130 | 115 | 98 |
| % UE retained | 107 | 119 | 108 | 92 |
| % M1 retained | 98 | 105 | 101 | 100 |
| Fourteen days @ 150° C. | | | | |
| Hardness change | +9 | 0 | +4 | 0 |
| % UTS retained | 17 | 84 | 55 | 42 |
| % UE retained | 2 | 73 | 47 | 35 |
| % M1 retained | — | 99 | 96 | 91 |

[1]Masterbatch consisting of 100 parts Rubber "I", 130 parts paraffin oil, 42 parts clay, 5 parts wax, 2 parts ZnO
[2]Hisil® 233, which is a silica supplied by PPG
[3]Measured as a ratio of peak areas relative to the peak area measured for Composition Q
*Added prior to vulcanization The results indicate that as unreacted Si-H is eliminated from the compositions, the retention of physical properties after heat aging is dramatically improved.

EXAMPLE 7

Compositions prepared using transition metal catalyzed hydrosilylation are preferably stabilized using a compound which acts as a metal chelating agent. It is believed that transition metal catalyst residue is in an active valency, and this form of the metal may accelerate degradation. Chelation prevents the metal from engaging in this reaction, and long term heat aging properties of the compositions are improved by such stabilization. Two thermoplastic elastomer compositions were prepared using platinum catalyzed hydrosilylation, with one (Composition S) stabilized by the addition of 1 part per hundred parts rubber of 1,2-bis(3,5-di-ter-butyl-4-hydroxyhydrocinnamoyl)hydrazine and one (Composition T) remaining unstabilized. The physical properties of the compositions were measured immediately upon preparation and again after heat aging at 150° C. for three or five days. The results are set forth in Table VII.

TABLE VII

| | Composition "S" | | | Composition "T" | | |
|---|---|---|---|---|---|---|
| | Initial | Five Days | Retention | Initial | Three Days | Retention |
| Hardness (A) | 67 | 67 | 100% | 69 | (cracked) | — |
| UTS (psi) | 1190 | 1287 | 108 | 1121 | 255 | 23% |
| UE (%) | 405 | 470 | 116 | 375 | 2 | 0.5 |
| M1 (psi) | 504 | 457 | 91 | 504 | — | 0 |
| M3 (psi) | 982 | 946 | 96 | 982 | — | 0 |

Properties of the composition which contained no stabilizer dropped significantly after three days at 150° C., while the composition containing a metal deactivator retained its properties even after five days at 150° C.

EXAMPLE 8

In order to study the effect of extender oil, compositions were prepared as generally described above using polypropylene resin and EPDM rubber. Masterbatches of rubber were prepared containing three different extender oils with progressively tower aromatic fractions and lower sulfur and nitrogen concentrations. The masterbatch composition was 100 parts rubber, 100 parts extender oil, 42 parts clay, 2 parts zinc oxide and 5 pans wax. The polypropylene (41 parts) was added to this masterbatch of rubber "K" and mixed in a Brabender mixer at 180° C. until the polypropylene was melted. Silicone hydride (3 phr) was added dropwise to the mix, followed by addition of an oil solution containing platinum catalyst at various levels. The rubber was dynamically vulcanized by mixing the blend until maximum torque was reached. Additional processing oil (30 parts) was added after the cure. The product was removed from the mixer, then returned to the mixer and masticated at 180° C. for an additonal minute. Test specimens were prepared by compression molding the products at 200° C., and the oil swell properties were determined by the test method of ASTM D471, using IRN 903 oil at 125° C. for 24 hours. The results, expressed as percent swell (or weight gain) of the specimen, are set forth in Table VIII.

TABLE VIII

| | Extender Oil A[1] | | | Extender Oil B[2] | | | Extender Oil C[3] | | |
|---|---|---|---|---|---|---|---|---|---|
| Pt Catalyst | OS | S:Pt | N:Pt | OS | S:Pt | N:Pt | OS | S:Pt | N:Pt |
| 0.25 ppm | 339 | 14300 | 8942 | — | — | — | 119 | 24 | 55 |
| 0.5 | 285 | 7150 | 4471 | 105* | 227 | 2808 | 92.3 | 12 | 23 |
| 1.0 | 222 | 3575 | 2236 | 86.4 | 114 | 1404 | 85.3 | 6 | 12 |
| 1.9 | 140 | 1882 | 1177 | 85.8 | 60 | 739 | 85.6 | 3.2 | 6 |
| 2.4 | 98 | 1490 | 932 | 93.4 | 48 | 585 | — | — | — |

*Average of two tests
[1]Sunpar 150M oil (Sun Chemical) - contained 585 ppm S; 164 ppm N
[2]Sunpar LW150M oil (Sun Chemical) - contained 19 ppm S; 103 ppm N
[3]White Oil D-200 (Lyondell) - contained 1.0 ppm S; 1.0 ppm N The relative degree of swelling in oil is representative of the crosslink density of the vulcanized rubber, i.e. higher crosslink density in the rubber results in lower oil swell values. The data in Table VIII clearly shows that materials prepared using extender oil which has low amounts of sulfur and nitrogen, and where the mole ratio of sulfur or nitrogen to the platinum in the catalyst is low, results in a thermoplastic elastomer product which is much more effectively crosslinked by hydrosilylation. This effect is seen even at extremely low concentrations of catalyst.

EXAMPLE 9

Compositions were prepared using masterbatches of rubber with two different extender oils, under the conditions described in Example 8. The physical properties of the products were evaluated and are set forth in Table IX.

TABLE IX

| Extender Oil | C | A | C | A | C | A |
|---|---|---|---|---|---|---|
| Pt Catalyst (ppm) | 0.22 | 0.23 | 0.45 | 0.59 | 1.03 | 1.08 |
| Hardness (A) | 62 | 55 | 60 | 57 | 62 | 62 |
| TS (%) | 8 | 14 | 6 | 12 | 6 | 8 |
| UTS (psi) | 950 | 380 | 900 | 670 | 880 | 930 |
| M1 | 400 | 220 | 420 | 280 | 410 | 370 |
| UE (%) | 390 | 440 | 320 | 490 | 290 | 450 |
| OS (%) | 101.7 | 258.5 | 93.2 | 165.7 | 93.6 | 109.9 |

The use of extender oil "C", which contained very low levels of materials which have the chemical behavior of a Lewis base, resulted in thermoplastic elastomer products having excellent tensile properties and a high degree of crosslinking of the elastomer, even at catalyst levels as low as about 0.2 parts per million. In contrast, products prepared with extender oil "A", which contained higher levels of sulfur and nitrogen containing compounds, required the use of about five times more catalyst in the reaction to achieve similar properties.

EXAMPLE 10

Thermoplastic elastomer compositions were prepared using a rubber which had been extended with oil, blended to have an increasing concentration of sulfur compounds. The thermoplastic elastomers were prepared as described in Example 8, using a masterbatch of rubber "I". The properties of the products are set forth in Table X.

TABLE X

| S content of oil[1](mg) | 0.02 | 15.12 | 30.24 | 45.35 | 60.46 |
|---|---|---|---|---|---|
| N content of oil (mg) | 0.02 | 1.39 | 2.76 | 4.13 | 5.5 |
| Pt catalyst (ppm)/(mg) | 3.7/.07 | 3.8/.07 | 3.7/.07 | 3.7/.07 | 4.9/.09 |
| S:Pt mole ratio | 0.9:1 | 1316:1 | 2633:1 | 3948:1 | 4094:1 |
| N:Pt mole ratio | 3.7:1 | 276:1 | 548:1 | 821:1 | 851:1 |
| Hardness (A) | 58 | 55 | 57 | 55 | 55 |
| TS (%) | 6.5 | 6 | 8.5 | 9 | 11 |
| UTS (psi) | 800 | 760 | 865 | 800 | 676 |
| M1 (psi) | 400 | 360 | 360 | 300 | 260 |
| UE (%) | 290 | 330 | 330 | 560 | 604 |
| Gel (%) | 97.5 | 97.9 | 97.8 | 97.9 | — |
| OS (%) | 91 | 100 | 121 | 126 | 164 |

[1]Prepared by blending White Oil with Atoil (available from Petro Lube Ltd.) containing 3300 ppm S and 300 ppm N.

The effect of increasing sulfur and nitrogen content in the extender (processing) oil on cure state can be seen by the sharp increase in oil swell which occurs when the S:Pt mole ratio is above about 4000:1 and the N:Pt mole ratio is above about 800:1. The mole ratio of total material having the chemical behavior of a Lewis base to the platinum catalyst is desirably less than about 5000:1, and the preferred mole ratios of sulfur and nitrogen to platinum are less than about 2000:1 and 600:1, respectively. The most preferred mole ratios are less than about 1000:1 S:Pt and less than about 100:1 N:Pt.

EXAMPLE 11

Thermoplastic elastomer compositions were prepared following the method set forth in Example 8, and using rubber "J" as the elastomer. A comparison of the products made using two different extender oils is shown in Table XI.

TABLE XI

| S content of oil (mmoles) | 0.02 | 0.38 |
|---|---|---|
| Pt catalyst (ppm)/(mg) | 6.6/0.12 | 7.8/0.14 |
| SiH (phr) | 3.3 | 3.0 |
| S:Pt mole ratio | 1:1 | 17:1 |
| Hardness (A) | 62 | 60 |
| TS (%) | 7 | 7.5 |
| UTS (psi) | 910 | 924 |
| M1 (psi) | 410 | 345 |
| UE (%) | 420 | 482 |
| OS (%) | 106 | 174 |

Rubber "J" shows the same effect of improved crosslinking when an extender oil is used which is essentially free of materials which behave as a Lewis base with respect to the platinum containing catalyst.

While the best mode and preferred embodiment of the invention have been set forth in accord with the Patent Statutes, the scope of the invention is not limited thereto, but rather is defined by the attached claims.

What is claimed is:

1. In a process for the hydrosilylation crosslinking of a diene-containing elastomer by dynamic vulcanization under conditions of heat and shear in the presence of an olefinic thermoplastic resin, a hydrosilylation agent, a platinum-containing hydrosilylation catalyst and an extender or processing oil, the improvement which comprises employing an oil substantially free of sulfur having the chemical behavior of a Lewis base, in combination with a catalyst concentration of from about 0.01 to 4 ppm based on the weight of said elastomer, and expressed as platinum metal.

2. The process of claim 1 wherein the molar ratio of sulfur to the platinum in said catalyst is less than 4000:1.

3. The process of claim 1 wherein the olefinic thermoplastic resin is polypropylene and the elastomer is EPDM rubber containing 5-vinyl-2-norbornene as a diene monomer.

4. The process of claim 1 wherein after dynamic vulcanization the elastomer is in the form of discrete particles in a matrix of the thermoplastic resin, and is crosslinked to the extent that less than about 5 percent by weight of the crosslinkable elastomer can be extracted from the thermoplastic elastomer product by a elastomer solvent.

5. The process of claim 1 wherein said oil is selected from the group consisting of paraffinic, naphthenic and aromatic oils, or mixtures thereof.

6. The process of claim 1 wherein said oil is paraffinic white oil containing less than about 30 ppm of sulfur.

7. A thermoplastic elastomer product produced by the process of claim 1.

8. A molded or extruded article comprising the product of claim 7.

9. A process for the production of a thermoplastic elastomer composition, which process comprises the steps of:
   a) mixing (i) an olefinic thermoplastic resin and (ii) a diene-containing elastomer containing an extender oil which is substantially free of sulfur having the chemical behavior of a Lewis base,
   b) adding a hydrosilylation agent to the mixture from (a),
   c) blending the mixture from (b) at a temperature sufficient to cause the mixture to flow,
   d) optionally incorporating into the mixture a processing oil substantially free of sulfur having the chemical behavior of a Lewis base, e) incorporating into the mixture a platinum-containing hydrosilylation catalyst in an amount ranging from about 0.01 to 4 ppm, based on the weight of said elastomer and expressed as platinum metal, and f) masticating the mixture from (e) under conditions of heat and shear until the elastomer is crosslinked.

10. A thermoplastic elastomer product produced by the process of claim 9.

11. In a thermoplastic elastomer composition comprising a blend of olefinic thermoplastic resin, a rubber processing or extender oil, and a diene-containing elastomer, which elastomer has been crosslinked by dynamic vulcanization using a hydrosilylation agent and a platinum-containing hydrosilylation catalyst, the improvement comprising a composition wherein said oil is substantially free of sulfur having the chemical behavior of a Lewis base, and said catalyst has a concentration of about 0.01 to 4 ppm based on the weight of said elastomer, and expressed as platinum metal.

* * * * *